US008066561B1

(12) United States Patent
Friedman

(10) Patent No.: US 8,066,561 B1
(45) Date of Patent: Nov. 29, 2011

(54) METHODS FOR PLAYING COMPETITIVE WAGERING GAMES

(75) Inventor: Stacy Friedman, Beaverton, OR (US)

(73) Assignee: Olympian Gaming LLC, Beaverton, OR (US)

( * ) Notice: Subject to any disclaimer, the term of this patent is extended or adjusted under 35 U.S.C. 154(b) by 827 days.

(21) Appl. No.: 11/737,764

(22) Filed: Apr. 20, 2007

Related U.S. Application Data

(63) Continuation-in-part of application No. 10/271,670, filed on Oct. 15, 2002, now abandoned, and a continuation-in-part of application No. 10/271,684, filed on Oct. 15, 2002, now Pat. No. 7,316,397.

(51) Int. Cl.
*A63F 13/10* (2006.01)

(52) U.S. Cl. ........................................................ 463/16

(58) Field of Classification Search .................. 273/146, 273/292; 463/11–13, 16
See application file for complete search history.

(56) References Cited

U.S. PATENT DOCUMENTS

| | | | | | |
|---|---|---|---|---|---|
| 5,042,809 | A | * | 8/1991 | Richardson | 463/18 |
| 5,324,035 | A | * | 6/1994 | Morris et al. | 463/42 |
| 5,452,900 | A | * | 9/1995 | Skratulia et al. | 273/292 |
| 6,173,955 | B1 | * | 1/2001 | Perrie et al. | 273/146 |
| 7,185,889 | B2 | * | 3/2007 | VanZanten | 273/274 |
| 2006/0061036 | A1 | * | 3/2006 | VanZanten | 273/292 |
| 2008/0076520 | A1 | * | 3/2008 | Chan et al. | 463/20 |

OTHER PUBLICATIONS

"Scarne on Dice," by John Scarne, eighth edition, 1980, Melvin Powers Wilshire Book Company, Hollywood, Calif., pp. 390 to 392, on Scarney Chemin de Fer, increasing sequences in a dice game.*
"Scarne's Encyclopedia of Card Games," by John Scarne, 1973, HarperCollins, pp. 278 to 328 on banking games, increasing hands in card-based Chemin de Fer.*

* cited by examiner

*Primary Examiner* — David L Lewis
*Assistant Examiner* — Matthew D Hoel
(74) *Attorney, Agent, or Firm* — Muskin & Cusick LLC

(57) ABSTRACT

A system, method, and computer readable storage to provide a wagering game that awards bettors who correctly predict which of several parties in competition will be the last to successfully meet the requirements of a predetermined sequence of outcomes. Bettors can also wager on the length of the sequence achieved.

10 Claims, 3 Drawing Sheets

METHODS FOR PLAYING COMPETITIVE WAGERING GAMES

CROSS REFERENCE TO RELATED APPLICATIONS

This application is a continuation in part of application Ser. No. 10/271,670, filed Oct. 15, 2002, now abandoned, which is incorporated by reference herein in its entirety. This application is also a continuation in part of application Ser. No. 10/271,684, filed Oct. 15, 2002, now U.S. Pat. No. 7,316,397, which is incorporated by reference herein in its entirety.

BACKGROUND OF THE INVENTION

The present general inventive concept relates to a system, method, and computer readable storage for playing competitive wagering games based on alternating outcomes.

DESCRIPTION OF THE RELATED ART

In mathematics, a "sequence" is an ordered list of objects. An item in a sequence is called a term. The nth term of a sequence S may be denoted S_n. One example of a finite sequence is (1, 1, 1, 1, 1). That sequence has terms S_n=1 for all n. Another sequence is (1, 2, 3, 4, 5). This sequence has terms S__1=1, and S_n=S_(n−1)+1. In words, the first term equals 1 and each subsequent term is one greater than the previous term.

Many sequences can share the same property or sequence definition. For example, consider the sequences defined by the relationship: S_n>S_(n−1) for n>1. In words, this defines a sequence where each term S_n, starting after the first term n>1, is greater than the previous term S_(n−1). There are many such sequences. For example, each of the following sequences matches this definition: (1, 2, 3, 4, 5); (1, 3, 9); (4, 5, 8, 9, 11, 12).

As used herein, a "recursively-defined sequence" or a "recursive sequence" is a sequence defined by a recurrence relation. That is, a recursive sequence is a sequence wherein terms, other than the initial term(s), are defined by referring to one or more previous terms in the sequence. A famous example is the Fibonacci sequence, wherein each term is defined as S_n=S_(n−1)+S_(n−2), for all terms n>2. The initial two terms are S__1=1 and S__2=1, resulting in the sequence 1, 1, 2, 3, 5, 8, 13, 21, 34, 55, and so forth.

There are many possible recursive sequences. Examples of such recursive sequences are listed in Table I:

TABLE I

| Recursive Sequence Name | Recurrence Relationship |
|---|---|
| Greater than | S_n > S_(n − 1) for n > 1 |
| Less than | S_n < S_(n − 1) for n > 1 |
| Greater than or equal to | S_n >= S_(n − 1) for n > 1 |
| Less than or equal to | S_n <= S_(n − 1) for n > 1 |
| Alternating odd/even | S_n mod 2 != S_(n − 1) mod 2 for n > 1 |
| Alternating greater than and less than | (S_n − S_(n − 1)) * (S_(n − 1) − S_(n − 2)) < 0 for n > 2 |
| Increasing odd numbers | S_n > S_(n − 1) for n > 1, S_n mod 2 = 1 for all n |
| Decreasing prime numbers | S_n < S_(n − 1) for n > 1, S_n is prime for all n |
| Within 2 of previous term | \|S_n − S_(n − 1)\| <= 2, for n > 1 |
| More than 4 from previous term | \|S_n − S_(n − 1)\| > 4, for n > 1 |
| Less than if odd, greater than if even | S_n > S_(n − 1) for n > 1, S_(n − 1) mod 2 = 0; S_n < S_(n − 1) for n > 1, S_(n − 1) mod 2 = 1 |

It should be noted that a sequence defined by the recurrence relation "the next term is greater than or equal to the previous term" has a mathematical definition distinct from the typical patent-language interpretation, especially of the word "or". In mathematics, the operator "greater than or equal to" has a specific meaning which is distinct from either of the operators "greater than" or "equal to" alone.

House-banked casino games are typically based on the outcome of random indicia generated by either a casino machine, a casino employee or, in certain circumstances, a casino player. In blackjack or pai-gow poker, the cards are dealt by a casino dealer. In slot machines or video poker, the game outcome is generated by the machine. In roulette, the ball is spun into the roulette wheel by the casino croupier. In roulette, multiple players may wager on the outcome of the ball. In casino craps, the dice are rolled by a casino player, not a casino employee, and multiple players may wager on the outcome of the dice. In all cases, however, a single party or machine is responsible for generating the random gaming outcome.

Additionally, in all the aforementioned casino games, wagers are won and lost based on single instances of random outcomes, for example, a single spin of the slot machine reels, a single hand of blackjack, a single turn of the roulette wheel. At least two games in the prior art incorporate multiple random outcomes for the purposes of resolving a single wager. U.S. Pat. No. 5,829,748 to Moore Jr. discloses a dice wager which wins upon forty consecutive non-seven outcomes of two dice. U.S. Pat. No. 6,655,689 to Stasi discloses a dice wager for craps which wins if multiple craps numbers are rolled twice prior to the "seven-out" outcome.

What is needed is a new wagering method which will be enjoyable to players and which can provide novel wagering opportunities.

SUMMARY OF THE INVENTION

It is an aspect of the present general inventive concept to provide a wagering method based on a sequence of random outcomes.

The above aspects can be obtained by a method that includes (a) indicating a recursively-defined sequence of gaming outcomes; (b) identifying a plurality of outcome-associated parties; (c) accepting wagers on at least one of the propositions: which of said plurality of parties will be the last to successfully fulfill requirements of said sequence, and which of said plurality of parties will not be the last to successfully fulfill the requirements of said sequence; (d) generating random gaming outcomes using gaming indicia, each of said outcomes associated with a successive party, until the sequence has been terminated; (e) evaluating, when the sequence has been terminated, which of said plurality of parties was the last to successfully fulfill the requirements of said recursively-defined sequence; and (f) resolving the wagers in accordance with said evaluating.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
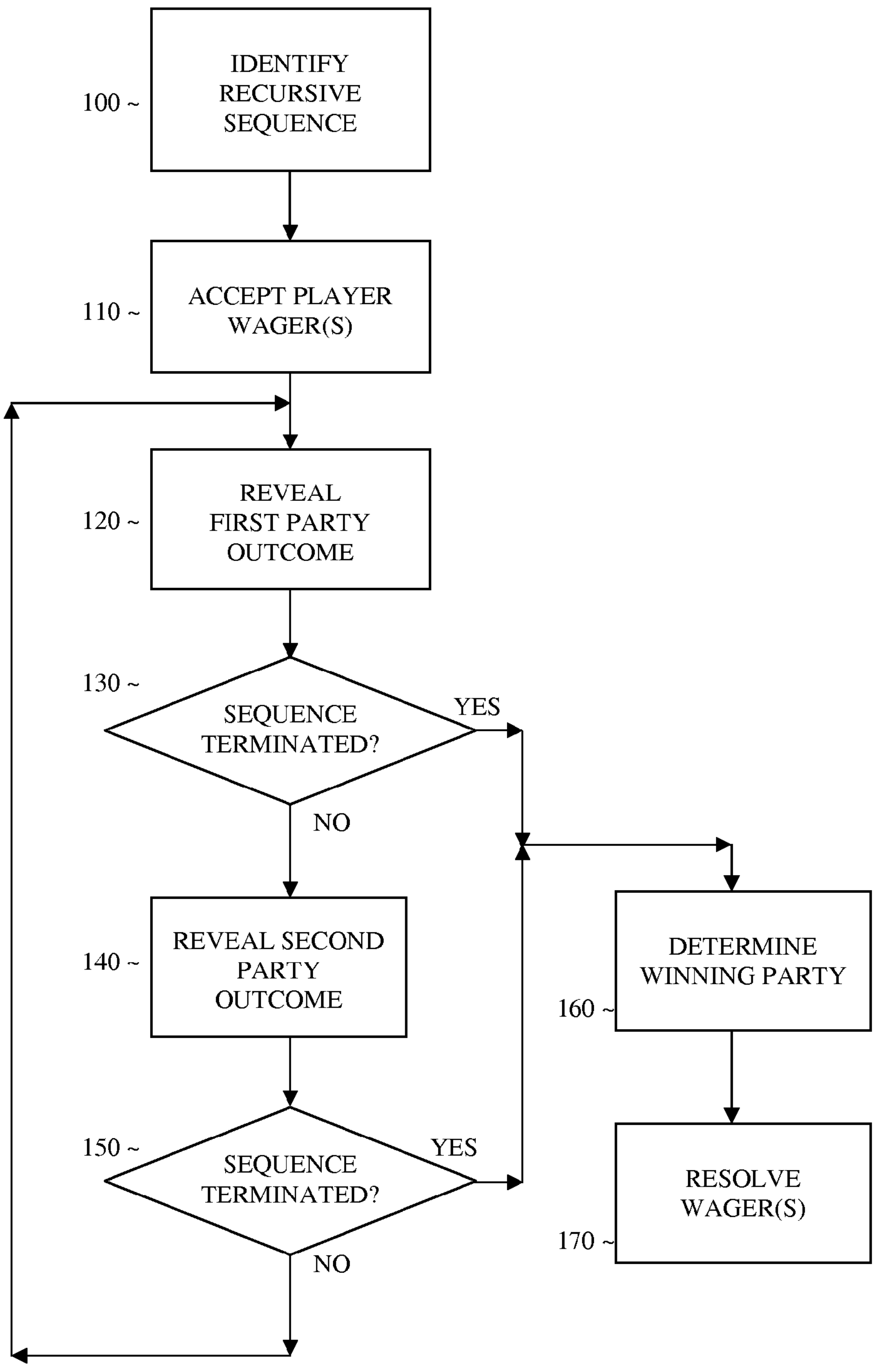
FIG. 1 is an exemplary flowchart for implementing a competitive wagering game based on a recursive sequence, according to an embodiment.

Reference will now be made in detail to the presently preferred embodiments of the invention, examples of which are illustrated in the accompanying drawings, wherein like reference numerals refer to like elements throughout.

The present general inventive concept relates to a method, system, and computer readable storage that provides wagering opportunities on the outcome of multiple parties in competition to fulfill the requirements of a predefined recursive sequence. This can be considered a "competitive sequence game".

FIG. 1 is an exemplary flowchart for implementing a competitive sequence game, according to an embodiment.

The method can start with operation 100, which identifies a recursive sequence which is required to be satisfied by each successive outcome. This sequence can be identified in any suitable fashion (e.g. a sign on the table, an instruction sheet, a help-screen on an EGD, a mathematical formula) as long as all participants in the game (bettors and/or operators) can be informed about the required sequence.

From operation 100, the method proceeds to operation 110, wherein wagers are accepted from players. This can be done as known in the art, for example, the player places a wager on a betting circle printed on a table felt layout, or the player makes a wager in an electronic gaming machine (EGM). In an embodiment, wagers are placed on which of the outcome-generating parties will be the last to successfully satisfy the requirements of the recursive sequence defined in operation 100. In another embodiment, as described herein, wagers are placed which can win as the length of the sequence increases, regardless of which party generated the outcomes.

From operation 110, the method can proceed to operation 120, which reveals a random outcome associated with the first party. This can be done using cards, dice, or other suitable random indicia, including slot machine reels, roulette numbers, tokens, etc.

From operation 120, the method can proceed to operation 130, wherein a determination is made as to whether the required recursive sequence is terminated. There are two cases where a sequence could be terminated. In one case, the just-generated outcome (and, depending on the sequence definition, prior generated outcome(s) are considered also) fails to meet the required sequence definition. For example, if the required sequence definition were "increasing dice rolls", and the previous roll was a 10 but a 6 was just rolled, this just-generated outcome would have failed to meet the required definition of rolling a number greater than 10. This can be called an unsuccessful termination. In another case, the just-generated outcome meets the required sequence definition, but no other possible outcomes could do so. For example, if the required sequence definition were "increasing dice rolls" and two dice were used, rolling a twelve (12) means that the sequence is terminated since it is impossible for another party to roll a number greater than twelve with two dice. This can be called a successful termination. In other cases, the sequence may still be continued. In an embodiment, a count or tally of the number of outcomes in the sequence to date is maintained. This count can include all terms of the sequence, all terms after the first term, or all terms which are continuations of the required sequence (that is, the count would not include a final term which caused the unsuccessful termination of the sequence).

If the result of operation 130 is that the sequence is not terminated, the method can proceed to operation 140, which reveals a random outcome associated with the second party. This can be (but need not be) done using the same random indicia used in operation 110, for example dealing a next card in a deck of cards, etc.

From operation 140, the method can proceed to operation 150, which makes the same evaluation regarding the termination of the sequence as operation 130, however now also taking into consideration the outcome revealed in operation 130.

If the result of operation 150 is that the sequence is not terminated, the method can proceed to operation 120, previously described.

If the result of either operation 130 or operation 150 is that the sequence is terminated, the method can proceed to operation 160, wherein the winning party is determined by considering the last outcome generated as described in operation 130 to evaluate whether the last outcome generated was a loser for the associated party (in which case the other party wins), or whether the last outcome generated was the last possible permissible outcome (in which case the associated party wins). In an alternate embodiment, wagers may be placed "to lose", such that the aforementioned conditions for winning and losing are reversed.

From operation 160, the method can proceed to operation 170, wherein wagers on the winning party are paid, while wagers on the losing party are taken. Additionally, any wagers on the length of the sequence are paid using a payout schedule as described in pending U.S. patent application Ser. No. 10/271,684, which is incorporated by reference herein in its entirety. An example of a sequence-length wager may pay 2-to-1 if the number of outcomes (terms) generated by the parties prior to the end of the sequence, and which fulfill the required sequence definition, is 4 terms or greater. The same wager may pay 1-to-1 if only three generated terms fulfill the required sequence, and the wager may lose if the sequence is 1 or 2 terms in length. It should be noted that a sequence-length wager as described herein is a wager where the payout is related to the length of the sequence (as counted or tallied using methods described herein). This is distinct from a wager on whether a particular sequence length will be achieved, where said wager may be a win-or-lose proposition. In the present invention, a sequence-length wager has at least two distinct winning outcomes and corresponding payout ratios, along with at least one losing outcome which takes some or all of the player wager.

In an embodiment, the two parties of FIG. 1 are both bettors playing a casino game. In another embodiment, one of the parties is a casino dealer, employee, or EGM, while the other party is a wagering player. In another embodiment, both parties are operated by the casino or by a gaming machine, while being treated as separate parties with separate outcomes. In this way, a bettor can wager on which of party 1 or party 2 will ultimately prevail, even though the outcomes of party 1 and party 2 are actually generated by the same casino dealer or EGM. In another embodiment, it should be noted that there may be more than two parties involved in the game, in which case the method of FIG. 1 would be expanded accordingly. In an embodiment, each party may be given more than one attempt to fulfill the requirements of the recursive sequence.

Note that a party is associated with each indicia revealed. Thus, for example, in a new game, a first party may be associated with a first indicia (e.g., a first card dealt). A second party (the "successive party") would be associated with a second card dealt. A third party (the "successive party") would be associated with the third card dealt. If there are three parties, then the successive party would revert back to the original (first) party. Consider each party to be constructively sitting in a circle, and as each outcome is generated, each party going around the circle is associated with each outcome. Thus, when all parties have had an indicia associated with them, association reverts back to the first party and continues as such. A successive party is simply a next party in a list of parties, wherein the successive party to the last party in the list is the first party in the list.

Figure 2:
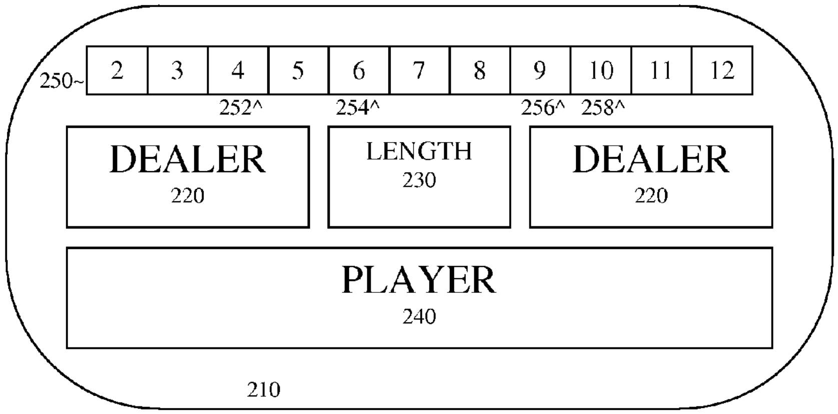
FIG. 2 is an exemplary table game felt layout for a dice game, according to an embodiment.

FIG. 2 is an exemplary casino game layout for a game played on a physical gaming table wherein a player and a dealer alternate throwing dice until one has failed to meet a sequence definition. Game layout 210 includes dealer wagering areas 220 for making wagers that the dealer will be the last to successfully continue the sequence and a player wagering area 240 for making wagers that the player will be the last to successfully continue the sequence. Length wagering area 230 is for making wagers on the overall length of the sequence. Indicator areas 250 allow the dealer to keep track of which number was last rolled by each party (the shooting player and the dealer); this can be done using lammers or pucks as is known in the art.

An example of the method of FIG. 1 using the layout of FIG. 2 and a pair of standard dice is presented. Joe approaches the table 210 which indicates on a placard (not shown in FIG. 2) that the required sequence is "increasing dice rolls". Joe places a $5 wager on the Player wagering area 240 that he will be the last party to successfully meet the requirements of this sequence. Joe receives a pair of six-sided dice and rolls a total of 4. This is indicated by placing a puck or lammer corresponding to Joe on the indicator area 252 for the total of 4. The dealer retrieves the dice and rolls in turn, rolling a total of 6. This is indicated by placing a puck or lammer corresponding to the dealer on the indicator area 254 for the total of 6. The dealer again retrieves the dice and gives them to Joe, who subsequently rolls a total of 10. This can be indicated by moving Joe's puck to the indicator area 258 for the total of 10. The dealer retrieves the dice and rolls in turn, rolling a total of 9. Since 9 is not a valid sequence outcome, the game is over (the sequence is terminated unsuccessfully by the dealer) and Joe is the last party to successfully meet the requirements of the sequence. Then Joe wins $5 on his wager.

An example of a length wager using the previous example is presented. Tina approaches the table 210 with Joe, and she places a $5 wager on the Length wagering area 230 that the sequence will continue for several rolls. As in the previous example, Joe and the dealer alternate rolls, but this time a count is kept of each roll. At the end of the game, the dice have been rolled four times, so the roll-count can be four. Alternately, the dice were rolled three times in the sequence, while the last time failed to meet the sequence requirement, so the roll-count can be three. Alternately, the dice were rolled successfully (that is, according to the sequence requirement) two times after the first number was rolled, so the roll count can be two. For this example, the latter version of roll count can be used. When the game is over, Tina's wager can be paid based on a paytable such as in Table II:

TABLE II

| Number of successful rolls | Award |
|---|---|
| 0 | Lose |
| 1 | 1-to-1 |
| 2 | 8-to-5 |
| 3 | 3-to-1 |
| 4 | 5-to-1 |
| 5 | 10-to-1 |
| 6 | 25-to-1 |

In the instant example, Tina wagered $5. The roll sequence was 4, 6, 10, 9. The roll count was two successful rolls (after the initial roll) prior to a party failing to meet the sequence requirements. According to the paytable in Table II, two successful rolls pays at 8-to-5, so Tina receives $8 in winnings on her $5 wager. It should be noted that Tina does not place separate wagers on whether the sequence will contain 2, 3, or 4 successful rolls, but instead can place a single wager which increases in value as the game continues. This can generate player excitement.

Figure 3:
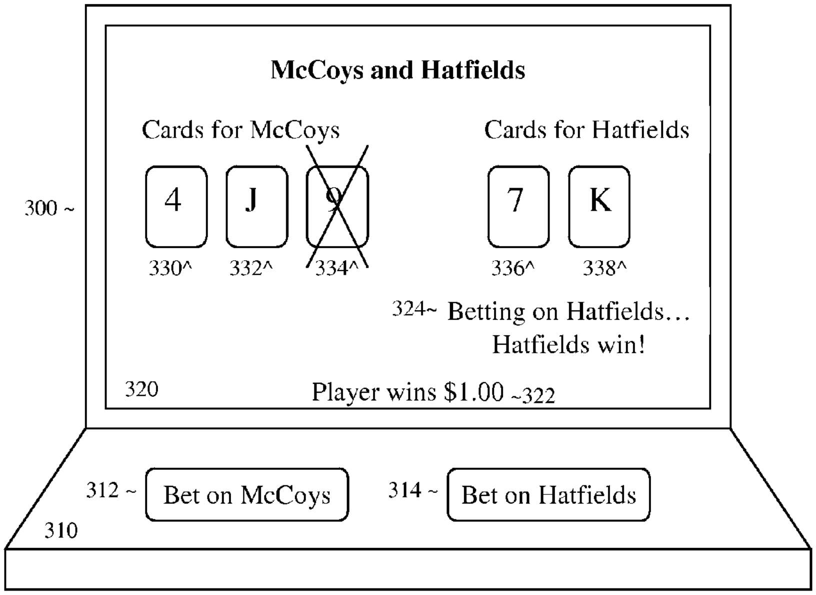
FIG. 3 is an exemplary electronic gaming machine display for a card game, according to an embodiment.

FIG. 3 is a depiction of an exemplary electronic gaming machine for playing the game of FIG. 1. Gaming machine 300 contains a button panel 310 and a video display 320. Not pictured are the remainder of the machine cabinet and any accessory hardware, including a coin acceptor, a bill acceptor, a ticket printer, a coin tray, a candle cap, or other mechanisms known in the art. The machine of FIG. 3 plays a game called "McCoys and Hatfields", wherein each side takes turn drawing cards until one side terminates an "increasing card" sequence. Button 312 allows a player to bet on the McCoys being the last to successfully continue the sequence, while button 314 allows a player to bet on the Hatfields being the last to successfully continue the sequence. Video display 320 contains cards 330, 332, 334, 336, 338, as well as informational messages 322 and 324.

An example of the game of FIG. 3 is presented. Mary approaches game 300 and deposits $20 into a bill acceptor (not pictured). A help screen (also not pictured) can describe that the required sequence is a sequence of increasing card ranks from 2 through Ace (where Ace is highest). After depositing money, Mary can depress button 314 to make a $1 wager that the Hatfields will be the last party to successfully meet the sequence requirement. The McCoys draw first and reveal a card 330 with the rank of 4. The Hatfields draw and reveal a card 336 with the rank of 7. The McCoys draw and reveal a card 332 with the rank of Jack. The Hatfields draw and reveal a card 338 with the rank of King. The McCoys draw and reveal a card 334 with the rank of 9. This final card terminates the sequence, so the game is over. The Hatfields were the last party to successfully continue the sequence, so Mary's wager on the Hatfields wins, and this is indicated via informational messages 322 and 324.

The present inventive concept contemplates many variations of a competitive wagering game based on a recursive sequence. In an embodiment involving two parties generating outcomes, one or the other party may prevail (as described herein) or neither party may prevail. This may be considered a tie, and could occur if, for example, the successive outcomes generated by the parties are identical. For example, in a dice game as described herein, with the "increasing dice rolls" sequence, the first party may roll a 4, the second party may roll a 6, the first party may roll a 10, and the second party may roll a 10. The second 10 outcome could end the sequence with a "tie" result, causing wagers on both parties to lose, but causing a third "tie" wager to win. As the probability of a tie with two dice in this fashion is undoubtedly lower than the probability of either party outright prevailing, it is expected that the tie wager will pay significantly more on a winning event than wagers on either the first or second parties. A tie would be determined in either operation 130 or operation 150 which would result that the sequence is terminated.

In a further embodiment, players may wager on which party will terminate the sequence. For example, in a game with three parties, a player may bet on the party the player thinks will be associated with an indicia that terminates the sequence. Thus, with parties A, B, and C, the player may bet on C, hoping that C's indicia will not fulfill the sequence (or will terminate it successfully), and thus winning his bet on C.

In a further embodiment, players may wager on which party or parties would not terminate the sequence. For example, in a game with three parties, a player may bet on each party the player thinks will not be associated with an indicia that terminates the sequence. Thus, with parties A, B, and C, the player may bet on A and B, hoping that C's indicia will not fulfill the sequence (or will terminate it successfully), and thus winning his bets on A and B.

In an embodiment, the parties may be given different numbers of attempts to fulfill the sequence requirements. For example, in an "increasing dice rolls" game where the player (as a first party) establishes a first number, the dealer (as a second party) may roll up to two times to continue the sequence. The player, on the next roll, may nonetheless only be given one opportunity to continue. By differing the number of chances to generate a successful outcome in this way, the odds may be skewed toward one party or another.

In another embodiment, multiple successive outcomes by a single party must fulfill the sequence requirement, not just one. For example, if a casino dealer (as a first party) generates a first outcome, the player (as a second party) may be required to fulfill the sequence requirements for two successive outcomes before it is again the dealer's turn. In this way, by requiring that the player generate two successful outcomes in a row for each dealer's one, the odds are skewed toward the dealer.

In another embodiment, a party may be required to generate multiple outcomes, each of which fulfills the sequential requirement relative to the previous party's outcome. For example, if a casino dealer (as a first party) in a dice game rolled a 5, the player (as a second party) may need to roll two numbers each greater than 5 to succeed, while the dealer would subsequently only need one number to succeed. In this way, by requiring that the player generate multiple successful outcomes relative to the previous outcome, instead of only one such outcome, the odds are skewed toward the dealer.

In another embodiment, additional wagers may be placed after the initial outcome is generated. The distinction between the initial wagers and any subsequent wagers can be equivalent to the distinction between the "pass" and "come" bets in craps, where the "come" bets are based on the same winning and losing outcomes but begin after an existing pass wager is already active. Thus, a secondary wager can be made after one or more outcomes has been generated, and that wager can apply to the sequence of outcomes generated from that point on.

Figure 4:
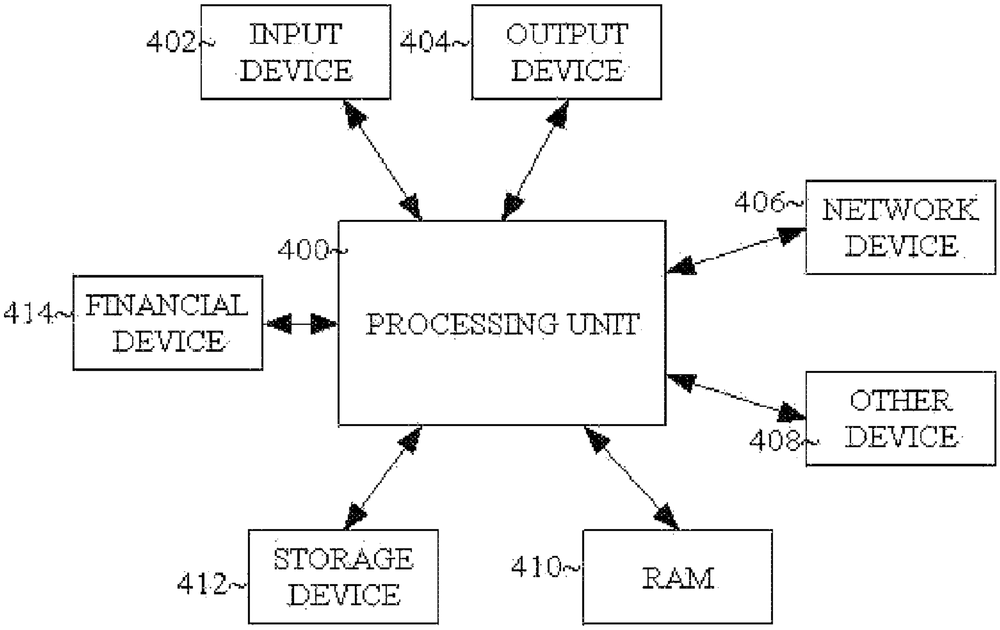
FIG. 4 is a block diagram illustrating an example of hardware used to implement an electronic gaming device (EGD), according to an embodiment.

FIG. 4 is a block diagram illustrating an example of hardware used to implement an electronic gaming device (EGD), according to an embodiment.

A processing unit 400 is connected to input device(s) 402 (which can be any combination of input devices, such as a keyboard, button(s), touch screen, etc.) The processing unit 400 is also connected to an output device 404, which can be any combination of output devices, such as an LCD display, touch screen, etc. The processing unit 400 is also connected to a network device 406, which can be used to connect the EGD to any type of network, such as a LAN and/or the Internet. The processing unit 400 can also be connected to any other device 408 which is known in the art and can be used to operate the EGD. The processing unit 400 is also connected to RAM 410, which can be used by the processing unit 400 in order to execute software which can implement programs used to play any embodiments described herein. The processing unit 400 is also connected to a storage device 412, which can be any type of storage device (e.g., ROM, CD-ROM, DVD, EPROM, etc.) which can store programs needed for implementation. The processing unit 400 can also be connected to a financial device 414 which can be used to process transactions, such as receiving payments (of cash or other form of payment) and making payments (cash or other form of payments).

Further, the order of any of the operations described herein can be performed in any order and wagers can be placed/resolved in any order. Any embodiments herein can also be stored in electronic form and programs and/or data for such can be stored on any type of computer readable storage medium (e.g. CD-ROM, DVD, disk, etc.). Any embodiments herein can be implemented using any wagering technology, including EGMs, live casino games, online (Internet) wagering games, or mobile (cell-phone) wagering games.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An electronic gaming apparatus comprising:

a processor;

a source of random gaming values;

an input device;

a display device;

wherein the processor is configured to execute instructions to perform the following operations after receipt of a player wager:

obtaining and recording a first random value from the source of random gaming values and a second random value from the source of random gaming values;

comparing each successive random value to an immediate prior random value wherein each value is compared to the immediate prior value;

if said comparison is of a predetermined nature, incrementing a running total by one and obtaining another random value;

if said comparison is not of a predetermined nature or a predetermined maximum running total has been reached, ending the game and comparing a final running total to a pre-established pay table; and if the comparison of the second random value to the first random value is of a predetermined nature, paying the player an award based on the player wager using said pay table, wherein the award is determined based on the final running total.

2. An electronic gaming apparatus comprising:

a processor;

a source of gaming randomness;

an input device;

a display device operable to display an amount of player credits;

at least one memory device;

a running total, stored in a memory device;

instructions stored in a memory device for an implementation of a comparison function between an immediate prior value and a current value returning a result which returns a true result if the immediate prior value and the current value form a predetermined relationship;

a paytable stored in a memory device, wherein the paytable maps running totals to payout values, wherein at least one running total maps to a payout value of zero, wherein the paytable contains payout values for at least a running total of 0, a running total of 1, and a running total of 2;

instructions stored in a memory device for a predetermined series-generation process providing that while the comparison function between an immediate prior value and a current value returns a true result, repeatedly performing the steps of (i) incrementing the running total, (ii) setting the immediate prior value equal to the current value, and (iii) prompting the source of gaming randomness for a new current value, until the comparison function between an immediate prior value and a current value does not return a true result or when the running total has reached a predetermined threshold, and then exiting the series-generation process;

wherein the processor is configured to execute instructions stored in a memory device to perform the following operations after receipt of a player wager:

prompting the source of gaming randomness for an immediate prior value;

prompting the source of gaming randomness for a current value;

executing the instructions for the predetermined series-generation process, resulting in a final value of the running total;

determining a payout value based on the final value of the running total, the paytable, and the player wager; and if the payout value is greater than zero, adding the payout value to the amount of player credits and updating the display to reflect an updated amount of player credits.

3. The electronic gaming apparatus of claim 2, wherein the source of gaming randomness is a virtual set of dice and the immediate prior value and current value are both based on point values of virtual rolls of the virtual set of dice.

4. The electronic gaming apparatus of claim 2, wherein the source of gaming randomness is a physical set of dice; the immediate prior value and current value are both based on point values of physical rolls of the physical set of dice.

5. The electronic gaming apparatus of claim 2, wherein the source of gaming randomness is at least one virtual deck of cards and the immediate prior value and current value are both based on point values of virtual hands drawn from the at least one virtual deck of cards.

6. The electronic gaming apparatus of claim 2, wherein the source of gaming randomness is a virtual collection of numbered tokens and the immediate prior value and current value are both based on point values of virtual tokens drawn from the virtual collection of numbered tokens.

7. An electronic gaming apparatus comprising:

a processor;

an input device;

a display device operable to display acceptance of a player wager;

at least one memory device;

the processor operable to execute instructions for a wager handling algorithm, stored in a memory device, the wager handling algorithm comprising:

accepting a wager of a wager amount, the wager being made using the input device, the wager amount being debited from a pre-established bank of wagering funds;

indicating, via the display, that the wager is accepted; and awaiting a completing of a wager-resolution method, wherein a payout value is determined and, if the payout value is greater than zero, adding the payout value to the pre-established bank of wagering funds, wherein the wager-resolution method comprises:

providing a source of gaming randomness;

maintaining a running total;

providing a comparison method between an immediate prior value and a current value which indicates a true result if the immediate prior value and the current value form a predetermined relationship;

providing a paytable which maps running totals to payout values, wherein at least one running total maps to a payout value of zero, wherein the paytable contains payout values for at least a running total of 0, a running total of 1, and a running total of 2;

providing a set of predetermined series-generation rules providing that while the comparison function between an immediate prior value and a current value indicates a true result, repeatedly performing the steps of (i) incrementing the running total, (ii) setting the immediate prior value equal to the current value, and (iii) prompting the source of gaming randomness for a new current value;

until the comparison method between an immediate prior value and a current value does not indicate a true result or when the running total has reached a predetermined threshold, and then ending the series-generation rules;

prompting the source of gaming randomness for an immediate prior value;

prompting the source of gaming randomness for a current value;

generating a series of random gaming values according to the set of predetermined series-generation rules, resulting in a final value of the running total; and determining a payout value based on the final value of the running total, the paytable, and the wager amount.

8. The apparatus of claim 7, wherein the source of gaming randomness is a set of dice and the immediate prior value and current value are both based on point values of rolls of the set of dice.

9. The apparatus of claim 7, wherein the source of gaming randomness is a deck of cards and the immediate prior value and current value are both based on point values of hands drawn from the deck of cards.

10. The apparatus of claim 7, wherein the source of gaming randomness is a collection of numbered tokens and the immediate prior value and current value are both based on point values of tokens drawn from the collection of numbered tokens.

* * * * *